UNITED STATES PATENT OFFICE 2,461,963

RUBBER HYDROCHLORIDE FILM

La Verne E. Cheyney, Akron, Ohio, assignor to Wingfoot Corporation, Akron, Ohio, a corporation of Delaware No Drawing. Application October 23, 1945, Serial No. 624,086

2 Claims. (Cl. 260—735)

This invention relates to a film of a rubber hydrochloride which is given increased permeability to carbon dioxide by suitable plasticization.

In the packaging of apples and other perishable fruit, it is desirable to use film of low water-vapor permeability, such as the rubber hydrochloride film known as Pliofilm. When apples are packaged in boxes lined with such film, they may be kept in their original crisp condition for many months. This prevents or limits such normal effects of aging as shriveling, molding, hardness, weight loss, mealy breakdown, etc.

On the other hand, when rubber hydrochloride film of usual plasticizer content is employed, the carbon dioxide content of the boxes rises so high as to cause the apples to develop brown heart and to remain in an unripe condition.

Investigation revealed that the carbon-dioxide transmission through rubber hydrochloride film could be increased by using as a plasticizer an alkoxyalkyl ester of an unsaturated fatty acid, such as:

Methoxyethyl oleate
Methoxymethyl linoleate
Butoxyethyl oleate
Methoxyethyl linoleate
Butoxyethyl linoleate
Methoxyethyl elaidate
Butoxyethyl elaidate
Amyloxyethyl oleate The fatty acid radical may contain fifteen to thirty-five carbon atoms or thereabouts and contains one or more olefin linkages. The alkyl and alkoxy groups may each contain from one up to about eight carbon atoms.

Although it has been found that the presence of such esters increases the carbon-dioxide permeability of rubber hydrochloride film, their solubility in rubber hydrochloride is low so that when used alone as a plasticizer, they have only a slight softening effect on the film and increase its carbon-dioxide permeability only a relatively small amount. In general, it may be said that if more than about 20 per cent of the ester is incorporated, bloom will occur on the film when stored at about room temperature although the maximum amount of ester which may be used without blooming varies with the different esters. By incorporating in the film an additional plasticizer for the rubber hydrochloride which is also compatible with the esters, it is possible to incorporate a larger amount of the ester in the film and thus increase its carbon-dioxide permeability. The following example is illustrative:

A rubber hydrochloride film .0016 inch thick, plasticized with 15 parts (based on 100 parts of rubber hydrochloride) of methoxyethyl oleate and 15 parts dibutyl sebacate had a carbon-dioxide transmission rate of 3400 milliliters per square meter per 24 hours according to a particular test. Rubber hydrochloride films of this thickness plasticized with the same amount of dibutyl sebacate (alone) or other plasticizers commonly employed in the films, such as dibutyl phthalate, butyl stearate, and the like, by the same test, gives a carbon-dioxide transmission of no more than about 700 milliliters per square meter per 24 hours.

Rubber hydrochloride film containing equal amounts of dibutyl sebacate and an alkoxylalkyl ester of an unsaturated fatty acid has been employed in packaging apples, and the fruit has been found to remain in excellent condition for months, free from the defects of fruit packaged in film of lower carbon-dioxide transmission rate.

Other problems connected with the preservation of apples, such as the development of mold or scalding, may be overcome by the incorporation in the film of other ingredients. For instance, mineral oil may be added in amounts of about 5 to 10 parts per 100 parts of rubber hydrochloride to prevent scald, and mold inhibitors may be added, such as orthophenyl phenol, diphenyl (biphenyl), tetramethyl thiuram disulfide, etc., in amounts of about 1 to 3 parts per 100 parts of rubber hydrochloride. These seem to have little or no effect on the rate of carbon-dioxide transmission through the film.

The cold strength of film plasticized with sebacate and oleate as above is outstanding as compared with rubber hydrochloride film plasticized with the same amount of other plasticizers, as determined by a "drop height" test; i. e., by clamping the film horizontally between two concentric rings and determining the height from which a 1-inch steel ball must be dropped in order to rupture the film. Whereas all other types of rubber hydrochloride film tested had a drop height of less than 10 inches at −20° F., the above film plasticized with 15 parts dibutyl sebacate and 15 parts methoxyethyl oleate gave a drop height of 30 inches.

Lima beans packaged in rubber hydrochloride film containing various plasticizers, chilled to −20° F., and then dropped repeatedly from a height of 1 foot showed that the packages made with the above preferred film could be dropped 10 times without breaking; whereas 1 or 2 drops was sufficient to break packages formed of the other films. Such films, therefore, have distinct possibilities for the packaging of carbon dioxide-emitting fruits and vegetables, such as peaches, tomatoes, cabbage, celery, beans, peas, etc., and in the quick-freezing or other freezing of the same and other fruits and vegetables where carbon-dioxide emission is not a problem.

What I claim is:

1. Rubber hydrochloride film plasticized with 15 parts dibutyl sebacate (based on the weight of the rubber hydrochloride) and 15 parts of methoxyethyl oleate.

2. Rubber hydrochloride film plasticized with about 15 parts of methoxyethyl oleate and about 15 parts of dibutyl sebacate per 100 parts of rubber hydrochloride, and containing 5 to 10 parts of mineral oil per 100 parts of rubber hydrochloride.

LA VERNE E. CHEYNEY.

REFERENCES CITED

The following references are of record in the file of this patent:

UNITED STATES PATENTS

| Number | Name | Date |
|---|---|---|
| 2,102,716 | Berch | Dec. 21, 1937 |
| 2,141,725 | Rosefield | Dec. 27, 1938 |
| 2,174,924 | McCleary | Oct. 3, 1939 |
| 2,250,232 | North | July 22, 1941 |
| 2,349,036 | Ferner | May 16, 1944 |